(12) United States Patent
Rauwendaal

(10) Patent No.: US 10,621,782 B1
(45) Date of Patent: Apr. 14, 2020

(54) SUB-PATCH TECHNIQUES FOR GRAPHICS TESSELLATION

(71) Applicant: Apple Inc., Cupertino, CA (US)

(72) Inventor: Randall R. Rauwendaal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 15/833,625

(22) Filed: Dec. 6, 2017

(51) Int. Cl.
*G06T 17/20* (2006.01)
(52) U.S. Cl.
CPC .................... *G06T 17/20* (2013.01)
(58) Field of Classification Search
CPC ...................................................... G06T 17/20
See application file for complete search history.

(56) References Cited

U.S. PATENT DOCUMENTS

| 9,001,123 | B1* | 4/2015 | Ames | G06T 17/205 |
| | | | | 345/419 |
| 9,105,125 | B2 | 8/2015 | Martin et al. | |
| 9,412,197 | B2 | 8/2016 | Goel et al. | |
| 9,519,982 | B2 | 12/2016 | Heggelund et al. | |
| 2014/0210819 | A1* | 7/2014 | Mei | G06T 17/20 |
| | | | | 345/423 |
| 2016/0358373 | A1* | 12/2016 | Fenney | G06T 17/20 |
| 2016/0358375 | A1 | 12/2016 | Lacey et al. | |

OTHER PUBLICATIONS

Henry Schafer, et al; Multiresolution Attributes for Hardware Tessellated Objects; IEEE Transactions on Visualization and Computer Graphics; Sep. 2013; pp. 1488-1798; vol. 19, No. 9.

* cited by examiner

*Primary Examiner* — Matthew Salvucci
(74) *Attorney, Agent, or Firm* — Kowert, Hood, Munyon, Rankin & Goetzel, P.C.

(57) ABSTRACT

Techniques are disclosed relating to tessellation of graphics patches. In some embodiments, tessellation circuitry is configured to divide patches into sub-patches for further independent processing. This may improve performance and/or reduce power consumption, in various embodiments. In some embodiments, the tessellation circuitry is first configured to divide an inner portion of the patch into a predetermined number of quad-shaped regions (e.g., three for triangle patches and four for quad patches). In some embodiments, the tessellation circuitry is configured to divide one or more of the regions into a number of sub-patches such that a value indicative of a number of vertices in each sub-patch is below a threshold value.

17 Claims, 15 Drawing Sheets

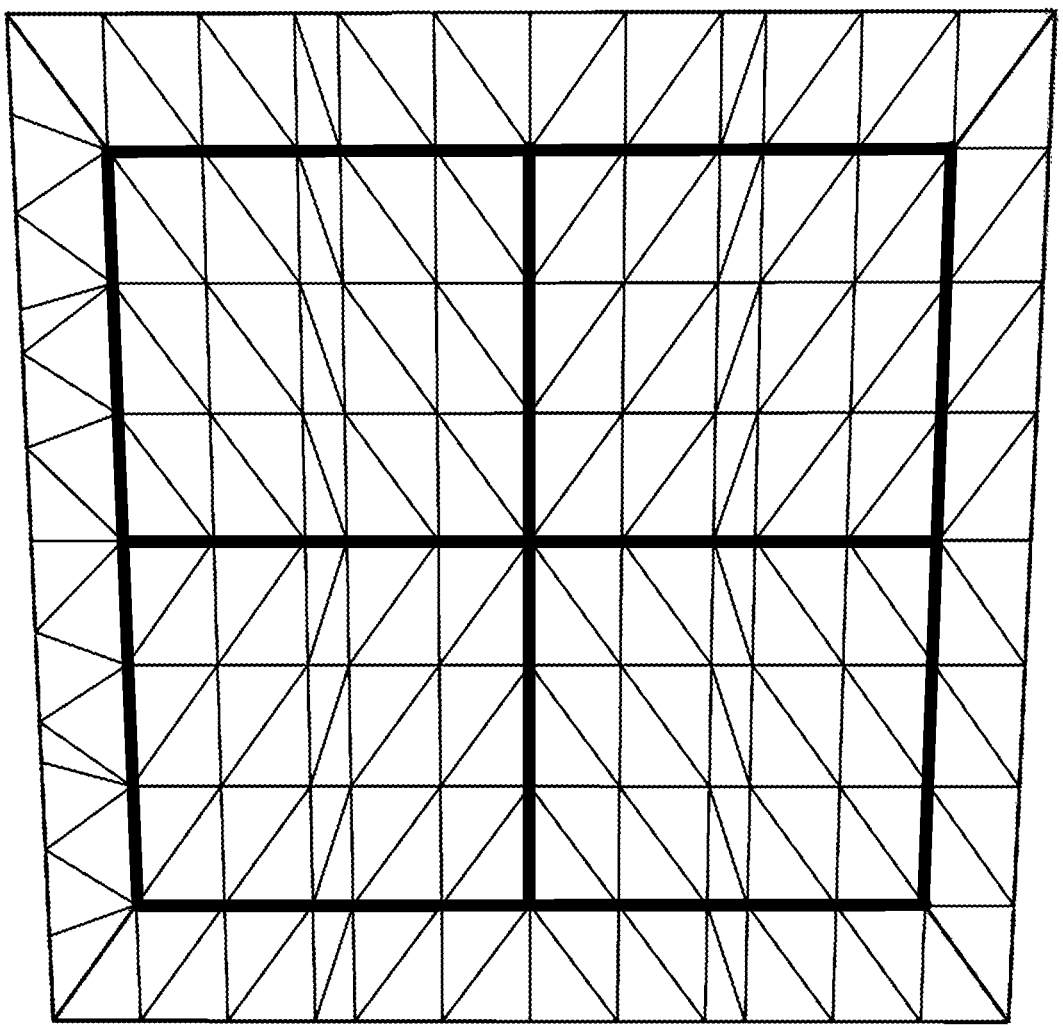

SUB-PATCH TECHNIQUES FOR GRAPHICS TESSELLATION

BACKGROUND

Technical Field

This disclosure relates generally to graphics processors and more specifically to tessellation techniques.

Description of the Related Art

In various graphics programming languages, tessellation is used to manage data sets of polygons corresponding to objects in a scene by dividing them into structures (e.g., into graphics primitives such as triangles) for rendering. For example, some graphics application programming interfaces (APIs) allow specification of three-pointed (triangle) and four-pointed (quad) patches and tessellation factors that indicate how the patch should be divided (e.g., how many vertices should be generated, how they should be spaced, primitive order, etc.).

The number of vertices and primitives for each patch may vary widely. For example, only a few triangles may be used to cover a patch that is further away in the scene and many triangles used to cover a patch that is closer in the scene. Therefore, it may be difficult for vertex processing circuitry to efficiently handle tessellation outputs for all patches in graphics programs. For example, if vertex processing circuitry is sized to handle the largest patches, it may be underutilized for smaller patches. Conversely, if vertex processing circuitry is configured to handle smaller patches, then it may suffer performance issues for larger patches.

BRIEF DESCRIPTION OF THE DRAWINGS

FIGS. 8A-8C illustrate exemplary quad-shaped region divisions for a quad patch with the same tessellation levels but different spacing parameters.

Figure 1A:
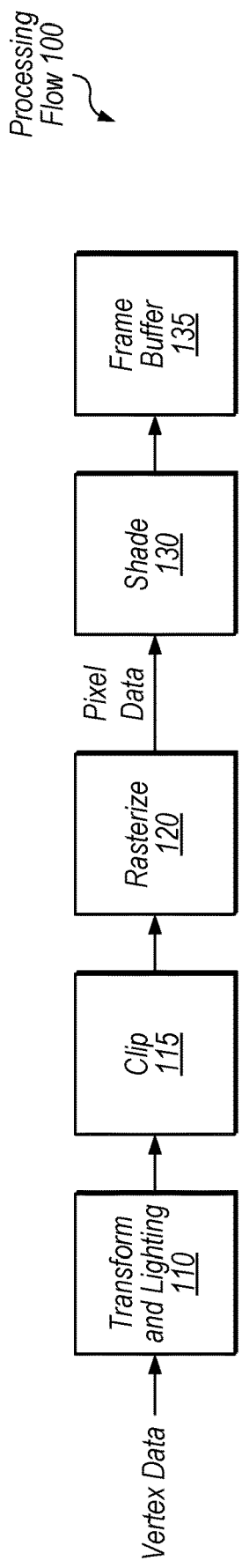
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "graphics circuit configured to perform graphics rendering" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first,"

"second," etc. are used as labels for ease of reference in the description and the appended claims.

DETAILED DESCRIPTION

Figure 1B:
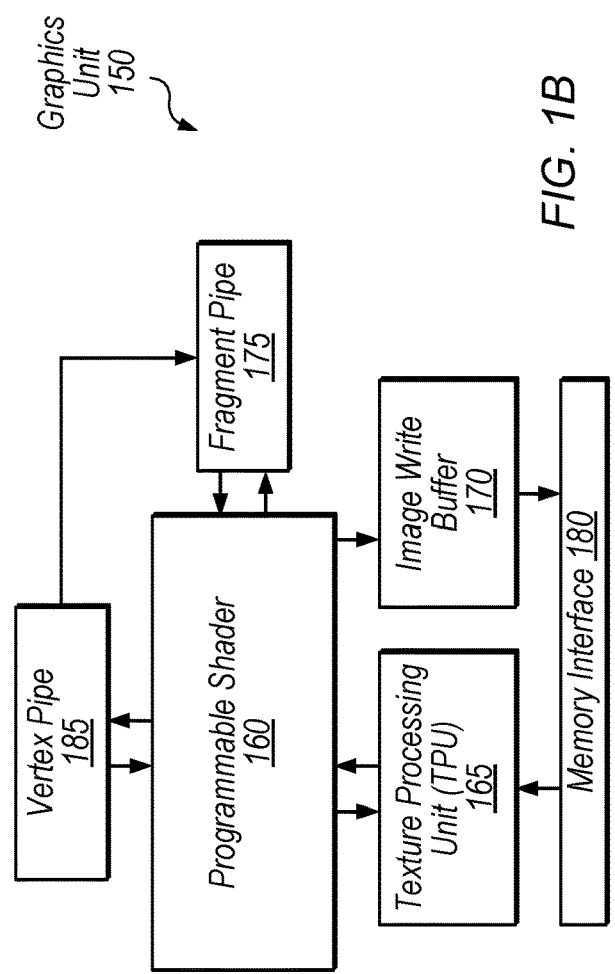
FIG. 1B is a block diagram illustrating one embodiment of a graphics unit.
Figure 2:
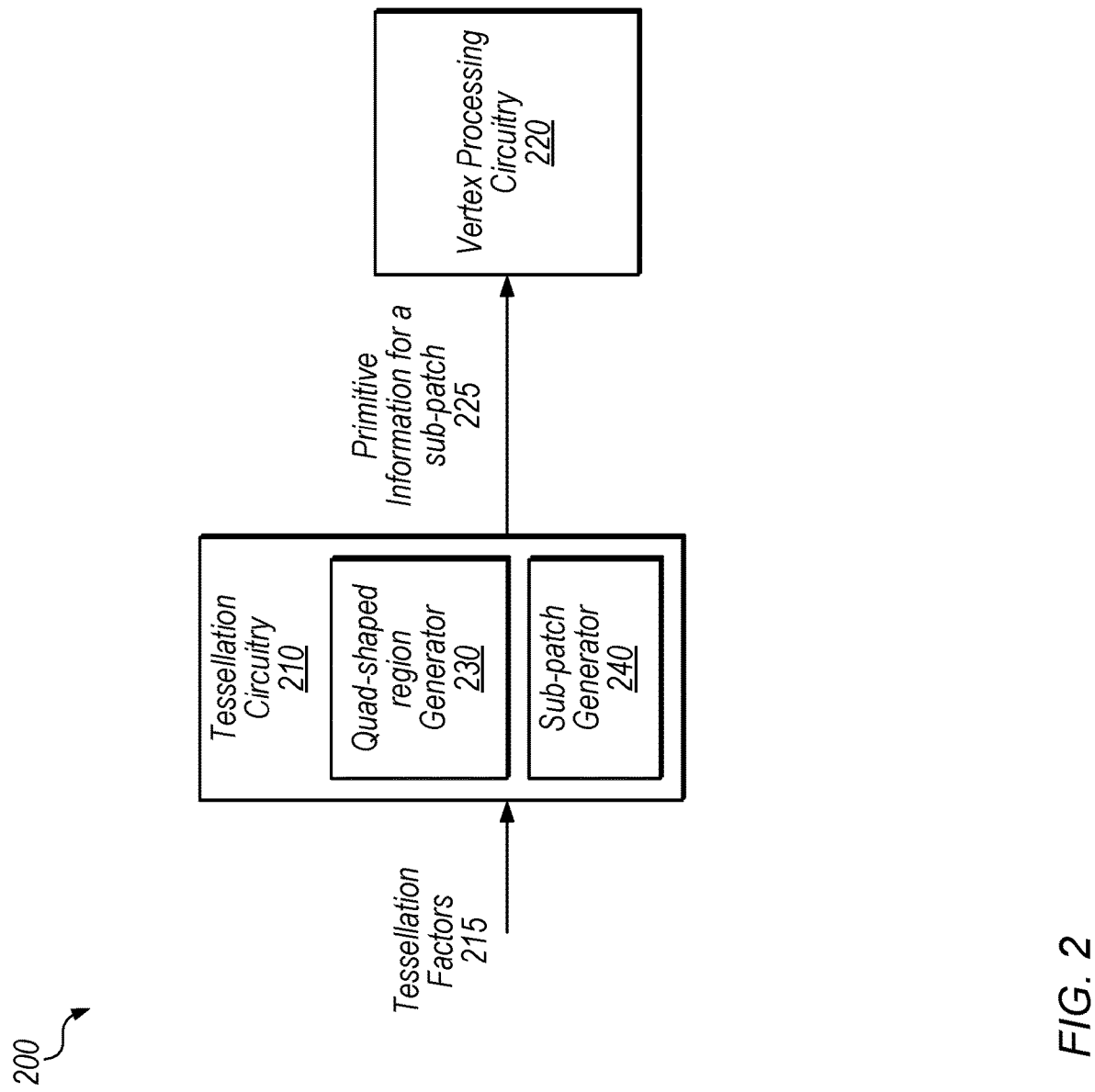
FIG. 2 is a block diagram illustrating exemplary tessellation circuitry configured to split certain patches into multiple portions, according to some embodiments.
Figure 3:
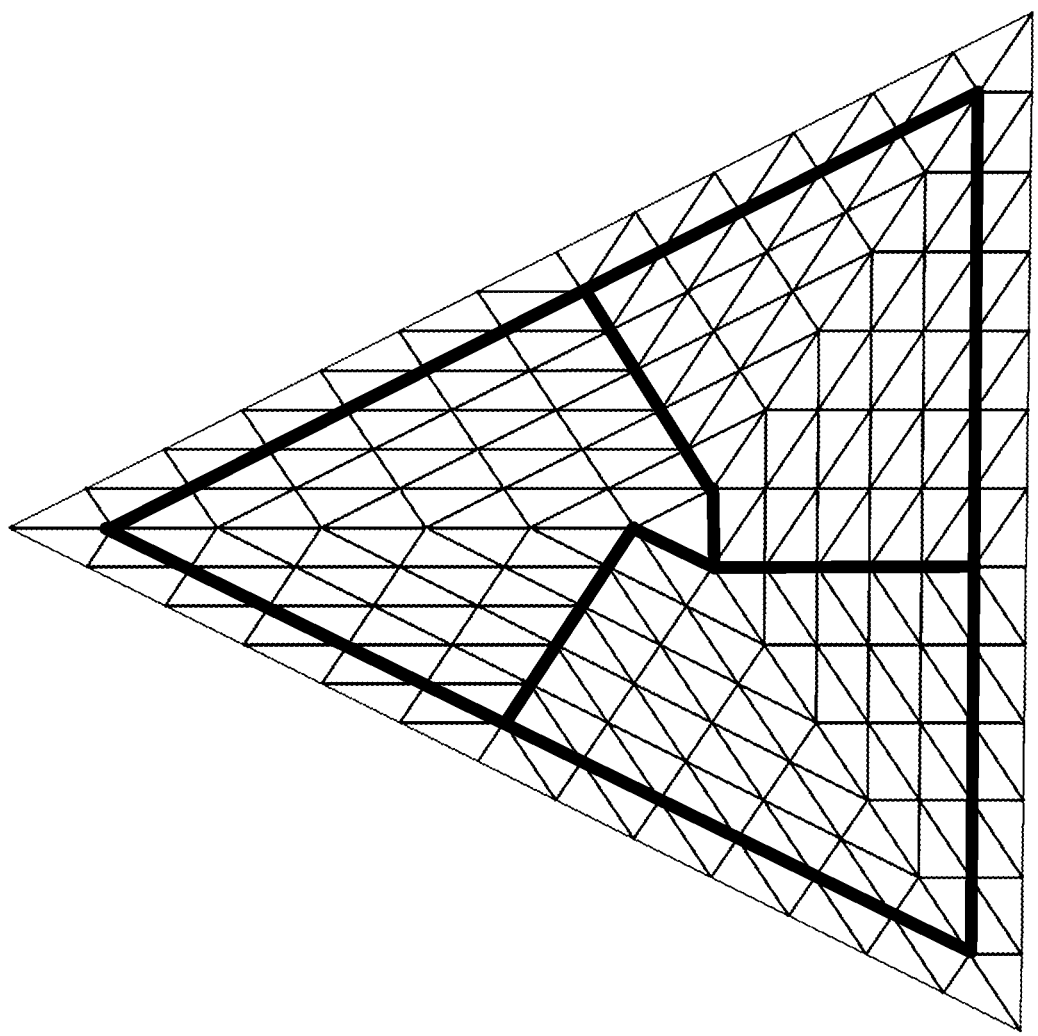
FIG. 3 is a diagram illustrating an exemplary division of a triangular patch into quad-shaped regions, according to some embodiments.
Figure 4A:
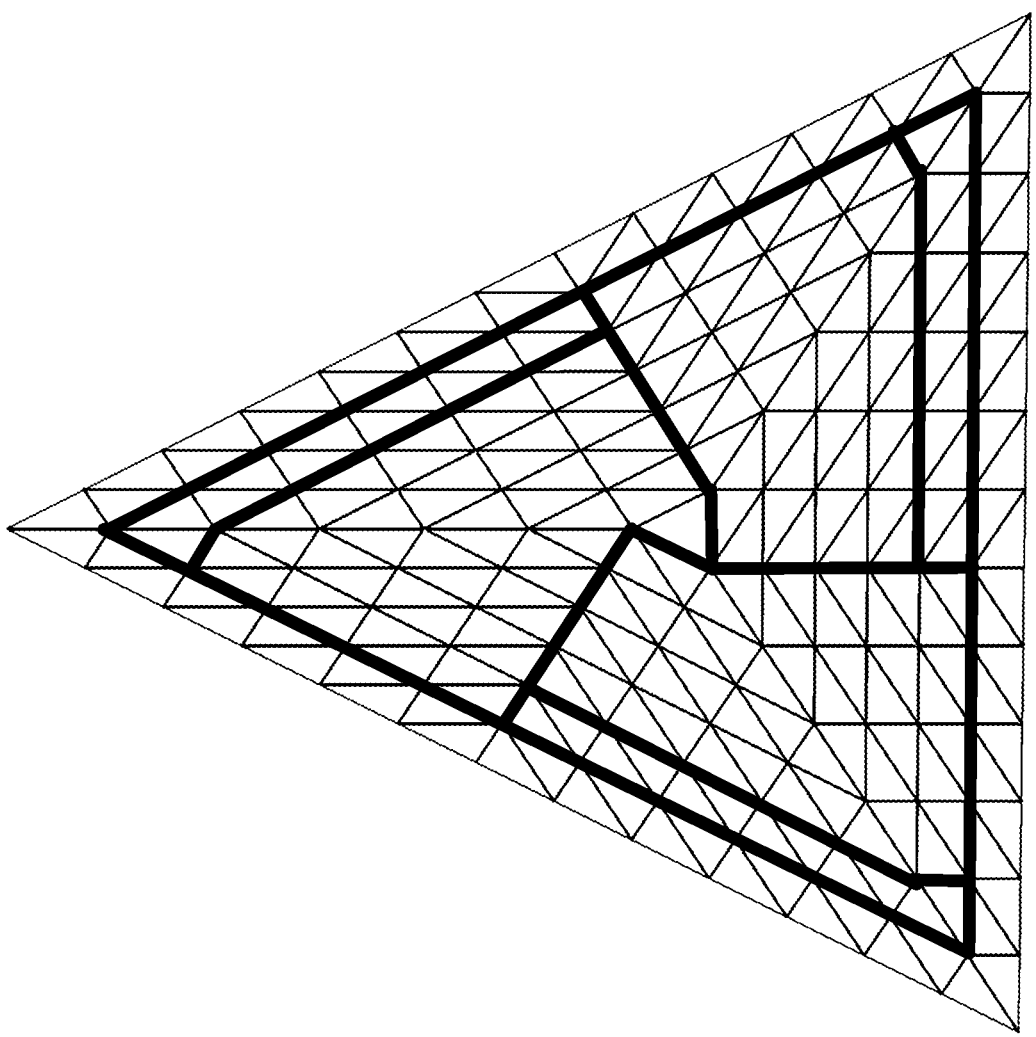
FIGS. 4A and 4B are diagrams illustrating exemplary division of quad-shaped regions into sub-patches, according to some embodiments.
Figure 4B:
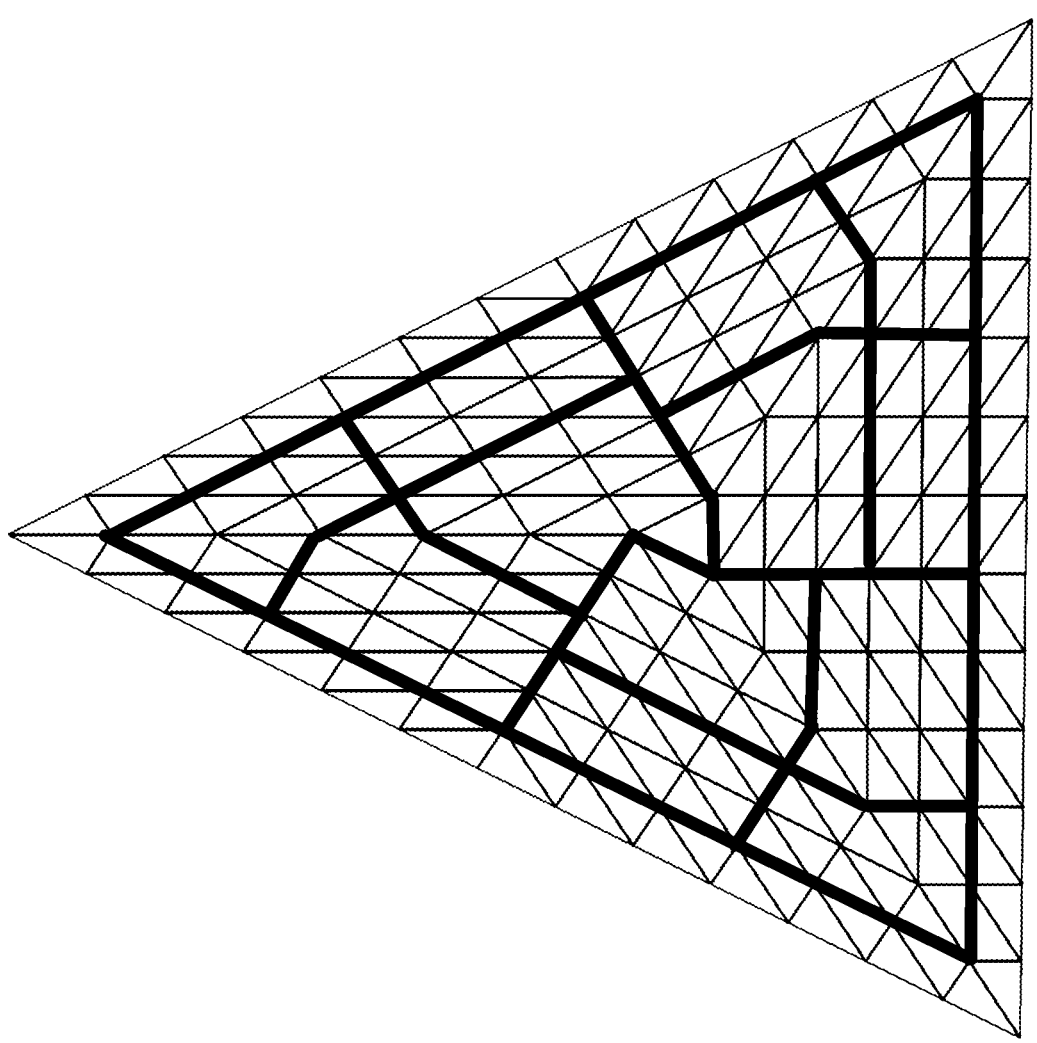
Figure 10:
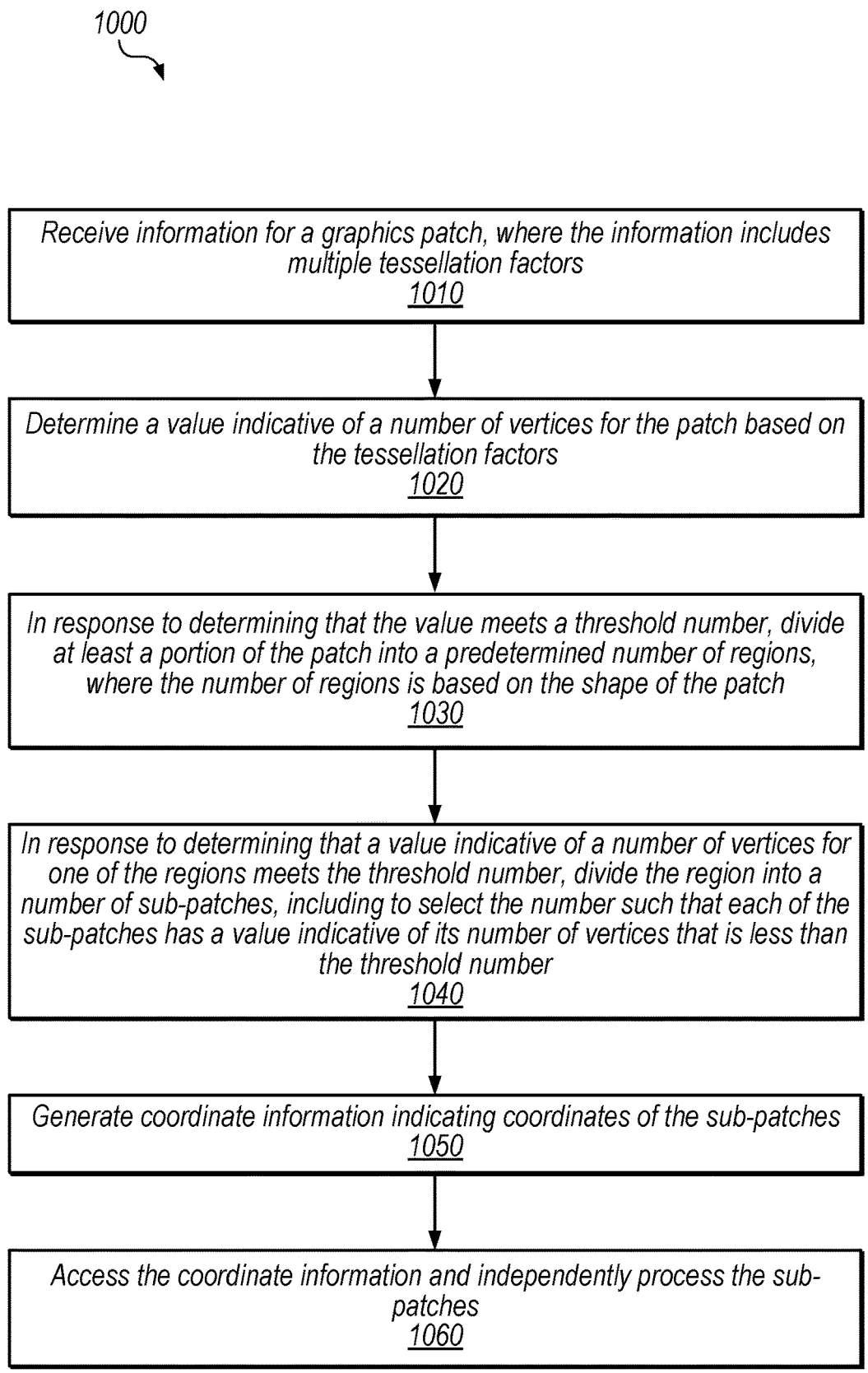
FIG. 10 is a flow diagram illustrating an exemplary method for generating independent tessellation outputs for sub-patches, according to some embodiments.
Figure 11:
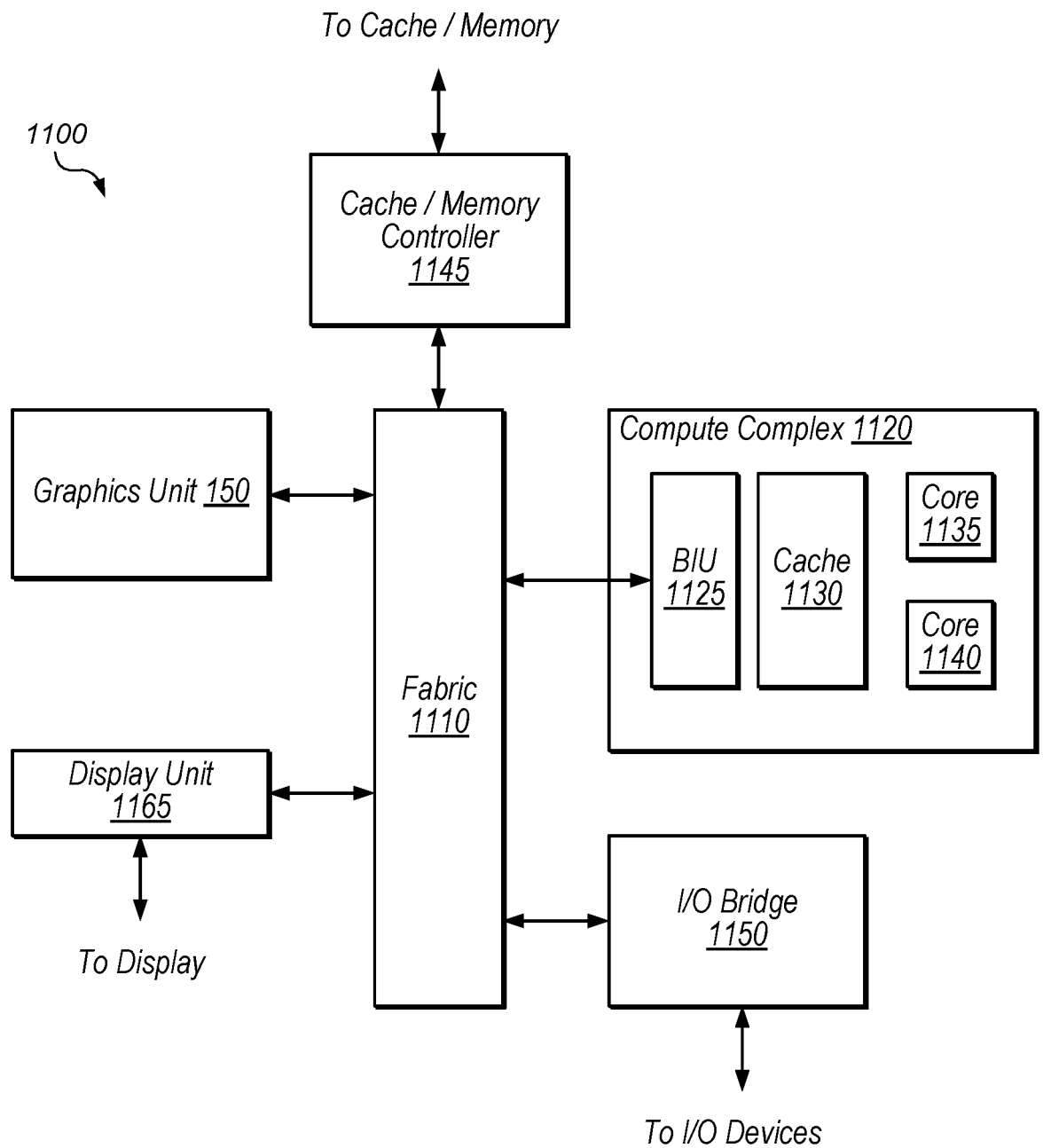
FIG. 11 is a block diagram illustrating one embodiment of a device that includes a graphics unit.
Figure 12:
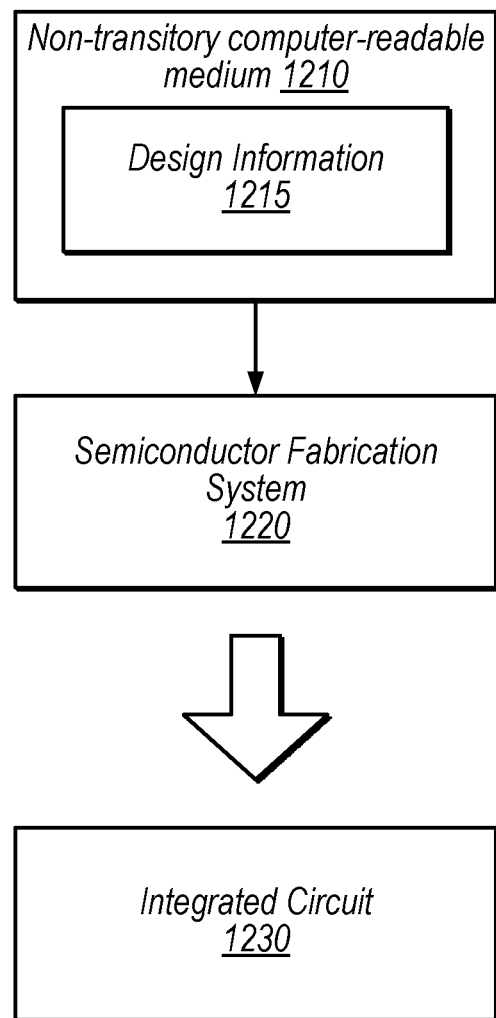
FIG. 12 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates exemplary tessellation circuitry while FIGS. 3 and 4A-4B illustrate exemplary divisions of a graphics patch into quad-shaped regions and sub-patches. FIGS. 5-9 illustrate patch examples with different spacing, different patch shapes, outer ring handling, techniques for determining region boundaries, etc. FIG. 10 illustrates an exemplary method, FIG. 11 illustrates an exemplary device, and FIG. 12 illustrates an exemplary computer-readable medium. In various embodiments, the disclosed techniques may provide deterministic tessellation results, may increase performance, and/or may reduce power consumption for processing tessellated patches.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview of Exemplary Tessellation Circuitry

FIG. 2 is a block diagram illustrating exemplary circuitry 200 that includes tessellation circuitry, according to some embodiments. In the illustrated embodiment, circuitry 200 includes tessellation circuitry 210 and vertex processing circuitry 220 (which may correspond to vertex pipeline 185 of FIG. 1B, for example). Note that FIGS. 3-9 illustrate various examples of patches that have been tessellated into triangular primitives based on exemplary tessellation factors. Speaking generally, tessellation circuitry is configured to generate primitives within a specified tessellation patch for use in further processing. Although triangular primitives are used herein for purposes of illustration, other primitive shapes may be used in other embodiments.

In the illustrated embodiment, tessellation circuitry 210 is configured to receive tessellation factors 215 for a graphics patch. The tessellation factors 215 may indicate the type of patch, type of spacing to be used, the type of primitives, primitive generation order (e.g., clockwise or counterclockwise), and tessellation levels. The tessellation levels, in some embodiments, indicate the number of vertices to be used to divide different portions of the patch. For example, for a triangular patch, four tessellation levels may be specified: an outer level for each side of the triangle (which may allow matching the number of vertices for the edges with neighboring patches, for example) and an inner level for the inside of the triangle. As another example, quad patches may use six tessellation levels: an inner width level, an inner height level, and an outer level for each side of the quad.

In some embodiments, the spacing parameter specifies one of the following options: equal, fractional even, or fractional odd. In some embodiments, equal spacing involves clamping each tessellation level to the closed range [1, max] and the result is rounded up to the nearest integer to give an effective tessellation level. In some embodiments, fractional even spacing involves individually clamping each tessellation level to the closed range [2, max] and the result is rounded up to the nearest even integer to give the effective tessellation level. In some embodiments, fractional odd spacing involves individually clamping each tessellation level to the closed range [1, max-1] and the result is rounded up to the nearest odd integer to give the effective tessellation level. Thus, determining effective tessellation levels may involve determining a potentially fractional value before the rounding. Further, the tessellation inputs may imply an ordering of vertices for each primitive. In other embodiments, other types of spacing may be implemented, the disclosed types of spacing are included for purposes of illustration but are not intended to limit the scope of the present disclosure.

Specific techniques for determining the number of primitives and their locations based on tessellation factors are well-understood and typically defined by an application programming interface (API), which may specify the types of patches that are supported and meanings for different parameters for tessellation. Tessellation factors are typically specified by an application developer and hardware generates vertex locations based on the specified factors. The various patch examples disclosed herein illustrate exemplary implementations of tessellation according to an example API. Specific details of how the primitive locations are determined are well-understood and are not discussed in detail herein.

Tessellation circuitry 210, in the illustrated embodiment, includes quad-shaped region generator 230 and sub-patch generator 240. In some embodiments, quad-shaped region generator 230 is configured to divide patches into quad-shaped regions and sub-patch generator 240 is configured to further divide the quad-shaped regions into sub-patches. In the illustrated embodiment, tessellation circuitry 210 is configured to output primitive information 225 for a sub-patch, e.g., for patches with more than a threshold number of primitives/vertices. Said another way, rather than processing and generating primitives for the entirety of the patch, tessellation circuitry 210 may break the patch into sub-patches that vertex processing circuitry 220 can independently process in an efficient manner. For patches with a small number of vertices, primitive information 225 may include information for the entire patch or information for a quad-shaped region. Techniques for determining borders for quad-shaped regions and sub-patches are discussed in greater detail below.

Vertex processing circuitry 220, in the illustrated embodiment, is configured to process up to a threshold number of vertices or primitives efficiently (e.g., from a power or performance standpoint). For example, vertex processing circuitry 220 may be configured to process up to the threshold number in parallel using parallel processing pipelines. As another example, vertex processing circuitry 220 may include local memory sufficient to store information for up to the threshold number, but may need to access another memory (which may require substantial time and power) to save information if larger numbers of vertices are processed. In some embodiments, the threshold number may change, e.g., in different processing modes where different amounts of information per vertex are stored. The threshold number may be fixed, may vary automatically, or may be programmable (e.g., at the driver level), in some embodiments.

In various embodiments, tessellation circuitry 210 is configured to generate primitive information 225 for sub-patches such that the primitive information for a given sub-patch includes less than the threshold number of primitives/vertices, which may increase overall performance and/or reduce overall power consumption. Further, in some embodiments, a multi-step technique is used to first split a patch into multiple quad-shaped regions, which are then divided in sub-patches if needed. The quad-shaped regions, in some embodiments, have from four to six sides and are roughly shaped like a rectangle, but may include additional sides to accommodate central primitive(s) of a patch. Thus, as shown in various examples herein, the term "quad shaped" does not imply a specific number of sides, but rather refers to regions that are roughly rectangular (e.g., such that any shorter sides other than the four primary sides are at most equal in distance to a side of one primitive). In other embodiments, other shapes of regions may be used, but the quad and quad-like shapes of the quad-shaped regions discussed herein may allow efficient division into sub-patches, in various embodiments.

Examples of Generating Tessellation Sub-Patches

FIG. 3 is a diagram illustrating an exemplary triangular patch that has been divided into three quad-shaped regions. In the illustrated example, the tessellation levels are all the same and have a value, for this particular example, of thirteen (three outer levels for each side and the inner level, in this example). In the illustrated example, the upper quad-shaped region has six sides and the other two quad-shaped regions have five sides. In various embodiments, the number of primitives within each quad-shaped region is the same to within one primitive for triangle patches and to within two primitives for quad patches (in the illustrated example, the upper quad-shaped region has one additional primitive relative to the others; FIG. 8C shows a quad example where the lower right quad-shaped region includes two fewer primitives than the other quad-shaped regions).

In some embodiments, tessellation circuitry 210 is configured to first determine a value indicative of a number of vertices for the patch (e.g., a number of vertices, a number of primitives, etc.) and is configured to divide the patch into quad-shaped regions if the value meets a threshold value. "Meeting" a threshold value may refer to being greater than or equal to the value or to being greater than the value, in various implementations. In some embodiments, tessellation circuitry 210 is then configured to determine whether a value indicative of a number of vertices for ones of the quad-shaped regions meets the threshold value. In these embodiments, in response to determining that the value meets the threshold, tessellation circuitry 210 is configured to divide the corresponding quad-shaped region into N sub-patches such that each sub-patch does not meet the threshold (e.g., such that each sub-patch can be efficiently processed). In some embodiments, the tessellation circuitry 210 is configured to select N as the minimum integer such that each sub-patch does not meet the threshold after the division into N sub-patches.

For example, in FIG. 3 the upper quad-shaped region includes sixty-one primitives. If the threshold was sixty-two, tessellation circuitry 210 would pass the quad-shaped region as a sub-patch without further division, in some embodiments. If the threshold was fifty, tessellation circuitry 210 would divide the quad-shaped region into two sub-patches, in some embodiments. If the threshold was twenty, tessellation circuitry 210 would divide the quad-shaped region into three sub-patches, and so on, in some embodiments. The sub-patches may or may not include similar numbers of primitives/vertices, so long as they all do not meet the threshold, in some embodiments.

FIG. 4A is a diagram illustrating an exemplary division of the quad-shaped regions of FIG. 3 into two sub-patches each, according to some embodiments. In the illustrated example, the upper quad-shaped region is divided into two sub-patches, one of which includes twelve primitives and the other of which includes forty-nine primitives.

FIG. 4B is a diagram illustrating an exemplary division of the quad-shaped regions of FIG. 3 into four sub-patches each, according to some embodiments. The difference between FIGS. 4A and 4B may arise from using different thresholds, e.g., a threshold of twenty-four vertices for FIG. 4B and a threshold of thirty-eight vertices for 4A.

Figure 5:
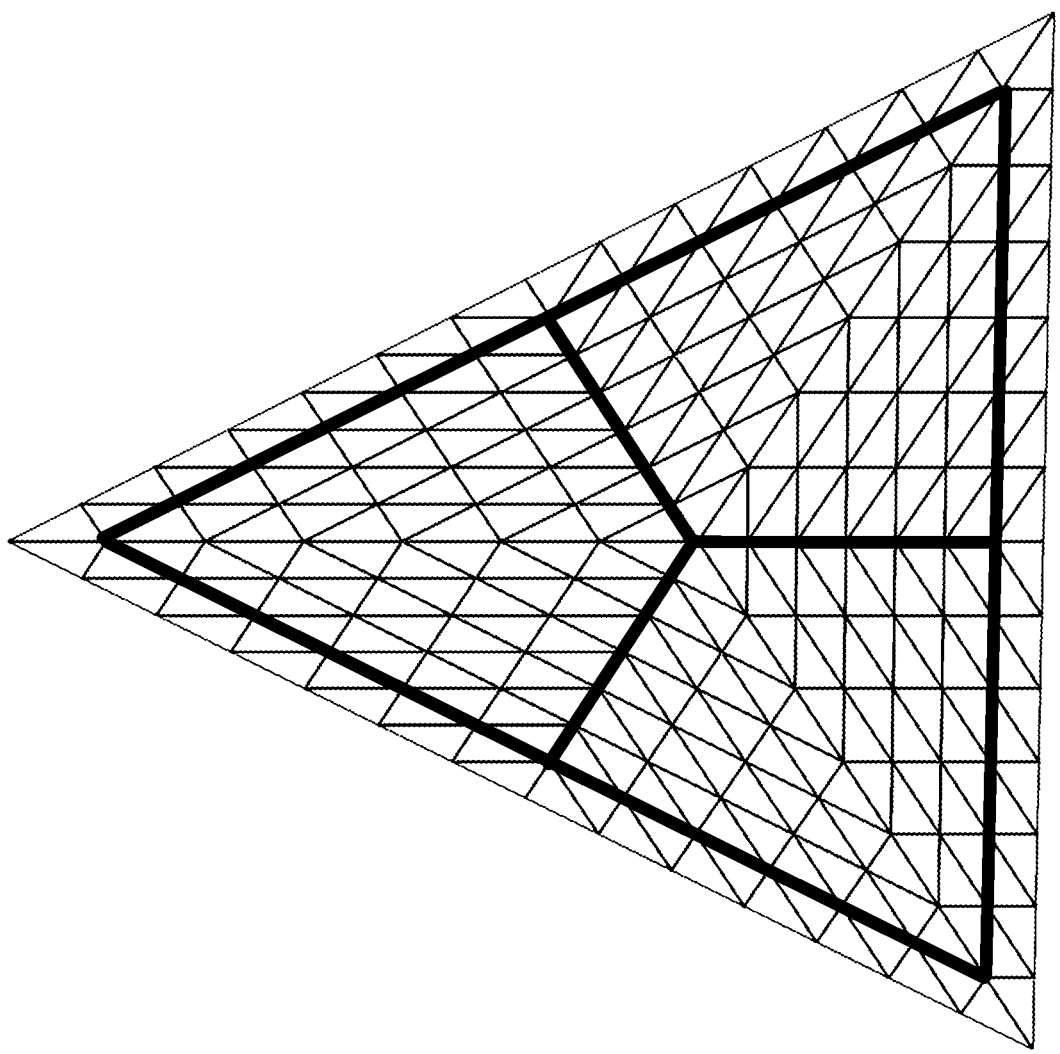
FIG. 5 is another diagram illustrating an exemplary division of a triangular patch into quad-shaped regions, according to some embodiments.

FIG. 5 is a diagram illustrating an exemplary triangular patch where a division into quad-shaped regions results in three four-sided quad-shaped regions that each include the same number of primitives and vertices. In this example, the tessellation levels are all fourteen and equal spacing is used. Whether the division into quad-shaped regions results in equally-sized quad-shaped regions may be a function of spacing type, tessellation levels, and patch shape.

Figure 6:
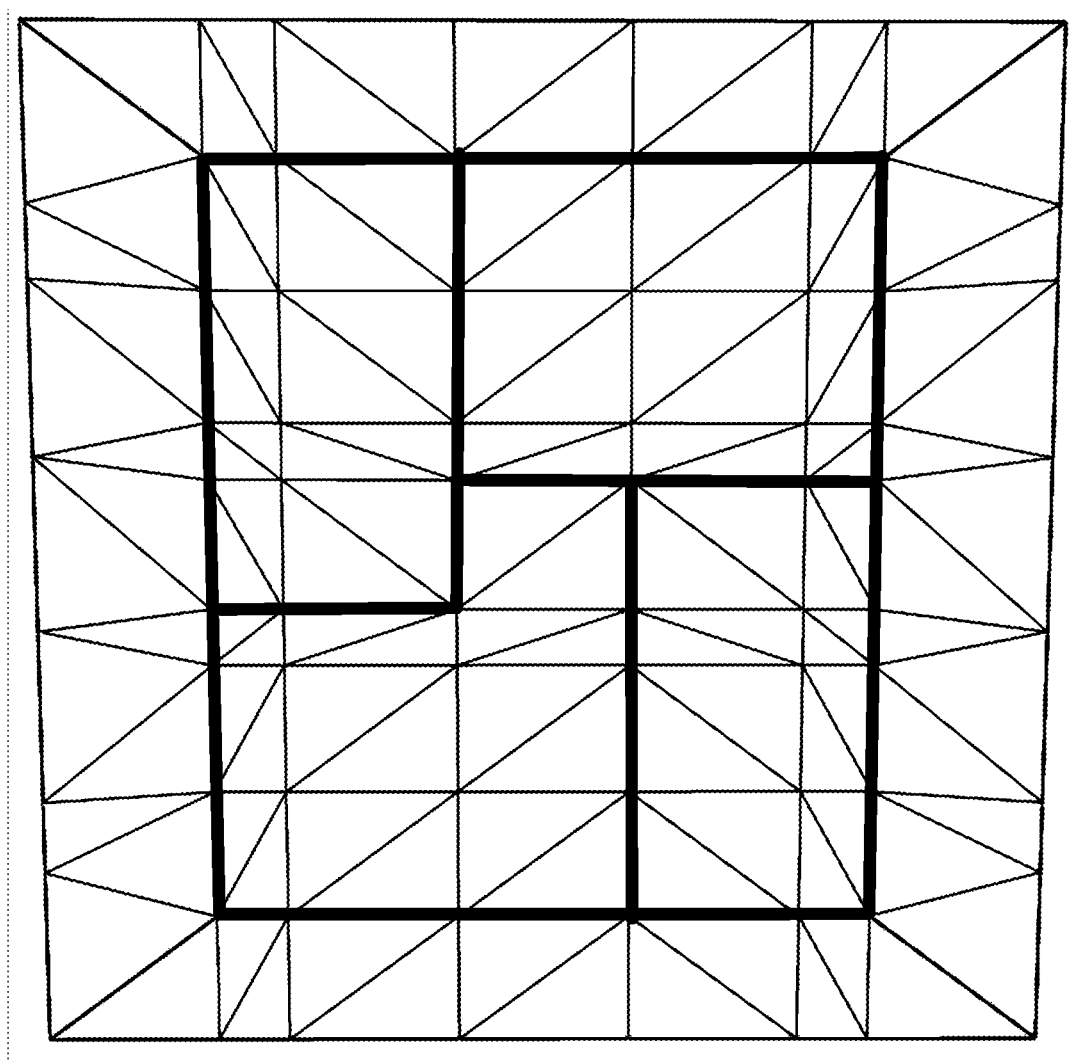
FIG. 6 is a diagram illustrating an exemplary division of a quad patch into quad-shaped regions, according to some embodiments.

FIG. 6 is a diagram illustrating an exemplary quad patch divided into four quad-shaped regions, one with six sides and the other three with four sides. In various embodiments, techniques disclosed with reference to one patch shape may be used for other shapes of patches. In some embodiments, quad patches are divided into four quad-shaped regions and triangular patches are divided into three quad-shaped regions.

Figure 7:
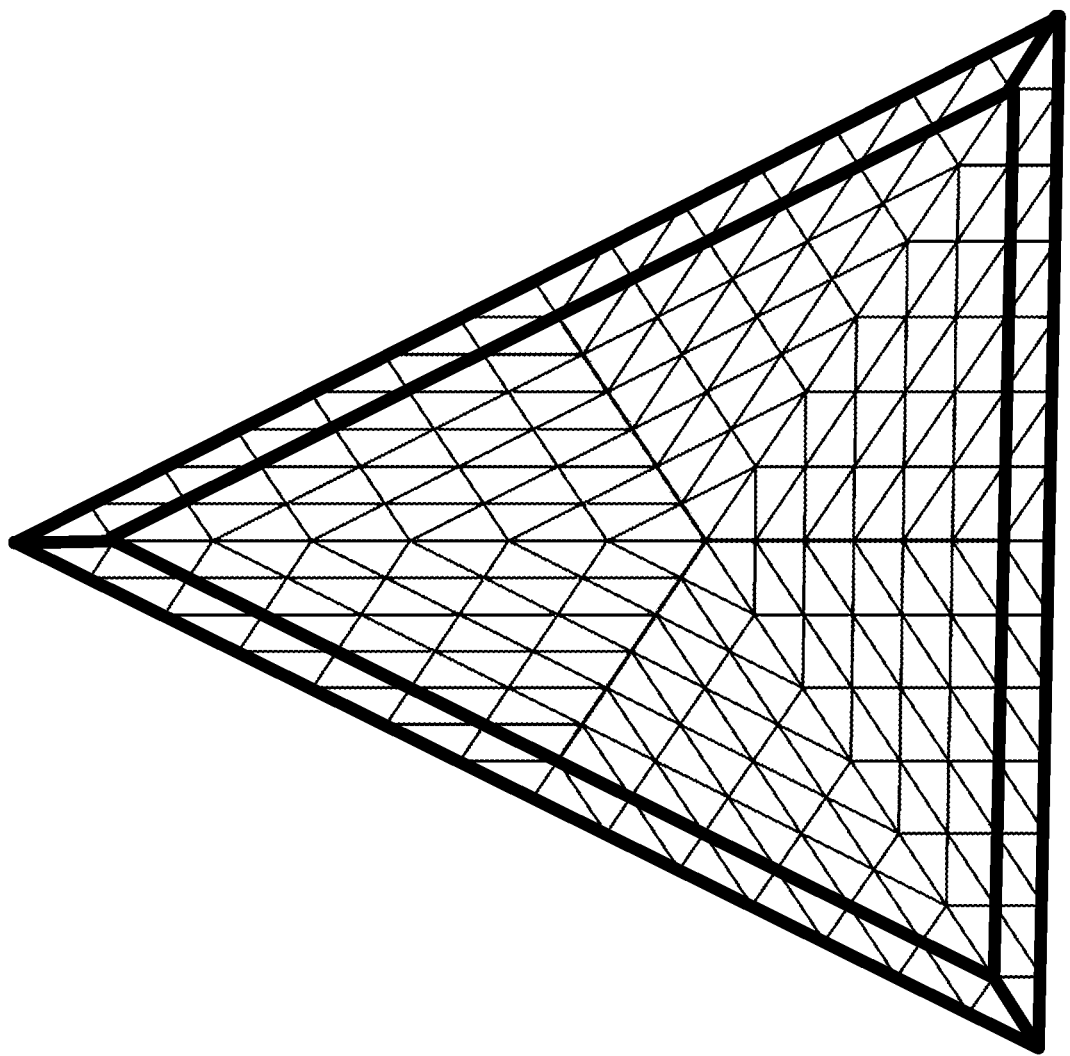
FIG. 7 is a diagram illustrating outer portions of a patch that may be separately handled by tessellation circuitry, according to some embodiments.

FIG. 7 is a diagram highlighting outer portions of a triangular patch. In some embodiments, the outer ring of each patch is handled separately from the inner portion (e.g., because of the different tessellation levels for each side of the patch). In the illustrated embodiment, the outer ring is divided into three sub-patches which may be processed similarly to the other sub-patches discussed herein. In some embodiments, the entire outer ring may be handled as a sub-patch. In some embodiments, the outer ring or portions thereof may be handled similarly to quad-shaped regions as discussed herein (e.g., by determining whether to split them into sub-patches based on the number of vertices present).

Figure 8A:
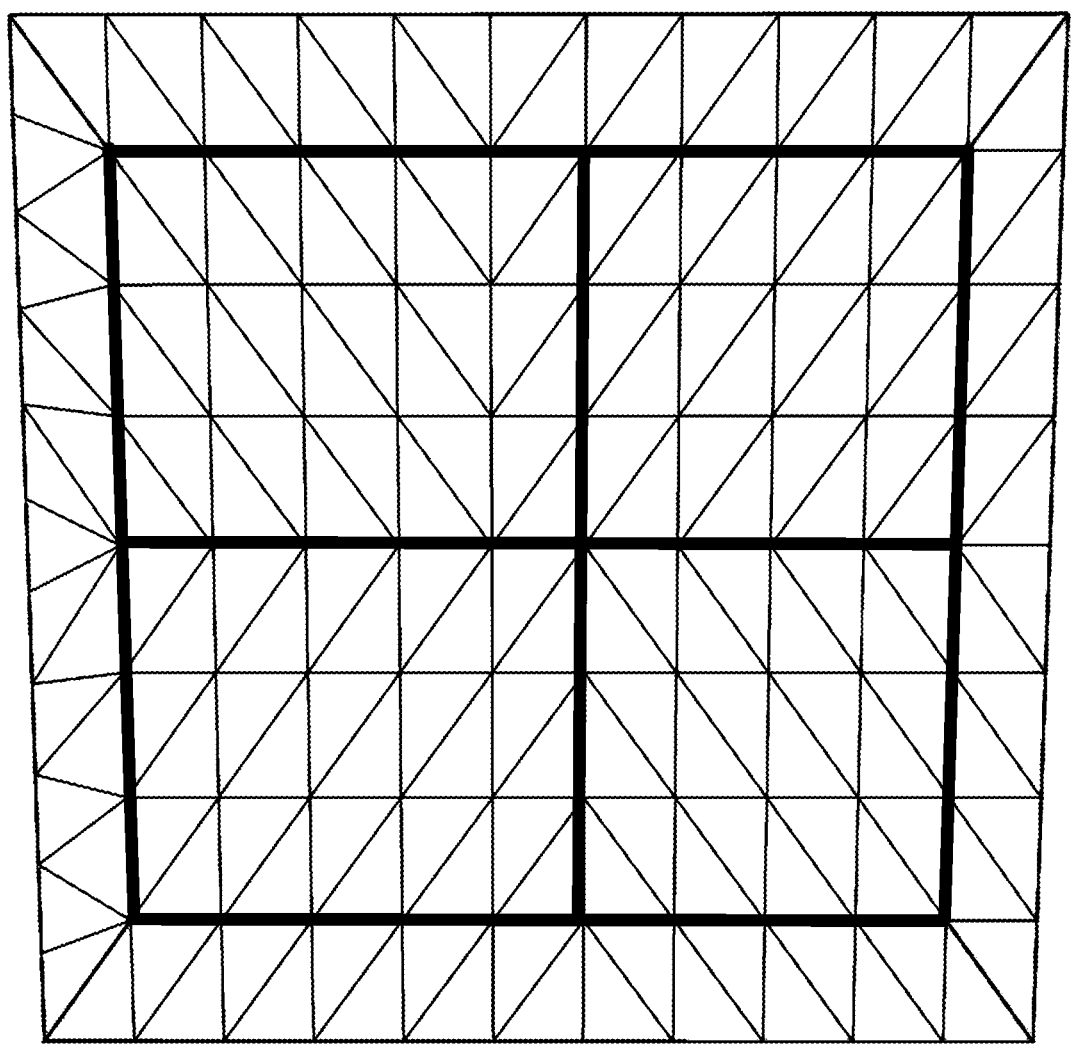
Figure 8C:
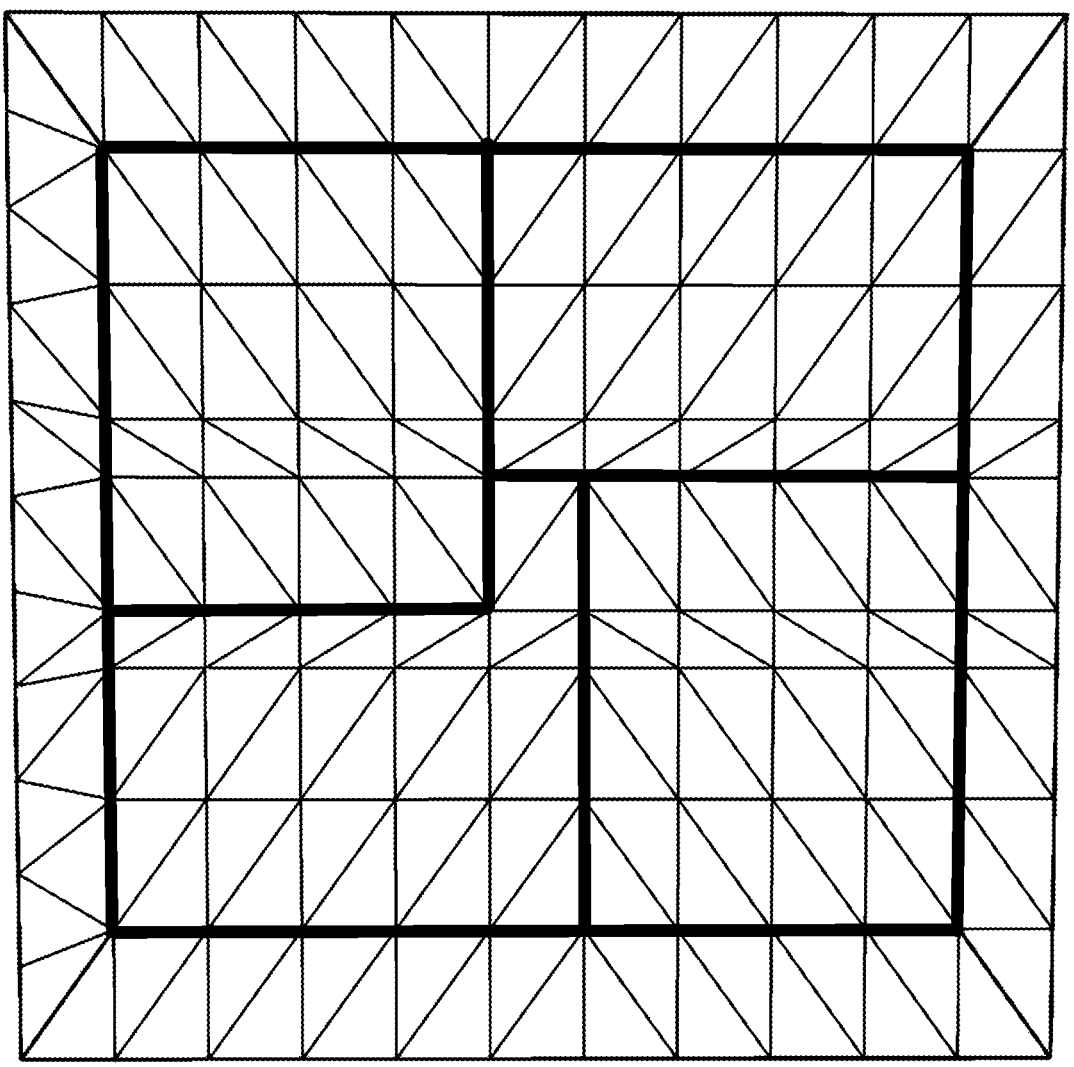

FIGS. 8A-8C illustrate the effects of different spacing types on quad-shaped region division, according to some embodiments. In the illustrated example, the same tessellation levels are used for the quad patches of FIGS. 8A-8C. Specifically, a value of eight is used for the inner width and the lower edge while a value of eleven is used for the remaining levels. In the example of FIG. 8A, equal spacing is used and the quad-shaped regions have equal sizes. In the example of FIG. 8B, fractional even spacing is used. In the example of FIG. 8C, fractional odd spacing is used. Although not shown, the quad-shaped regions in various examples may be split into sub-patches as needed. As shown, the disclosed techniques for generating quad-shaped regions may provide deterministic results for various spacing types.

In various embodiments, dividing patches into quad-shaped regions (if needed) and then sub-patches (if needed) may provide the performance and/or energy advantages of dividing patches, while allowing efficient handling of various types of patches. In particular, the shapes of the quad-shaped regions may be easier to sub-divide into sub-patches relative to attempting to directly divide patches into a desired number of sub-patches.

Exemplary Techniques for Determining Quad-Shaped Region Boundaries

Figure 9:
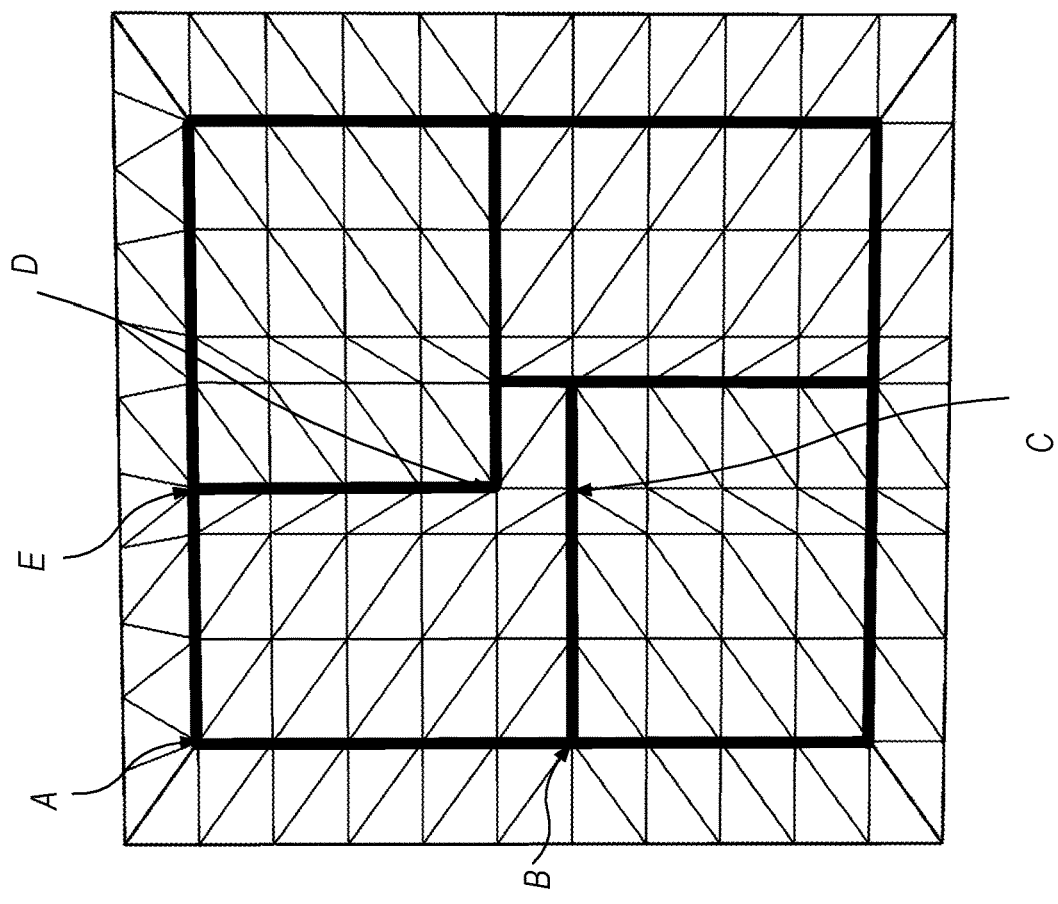
FIG. 9 is a diagram illustrating an exemplary technique for determining quad-shaped region boundaries, according to some embodiments.
Figure 9:
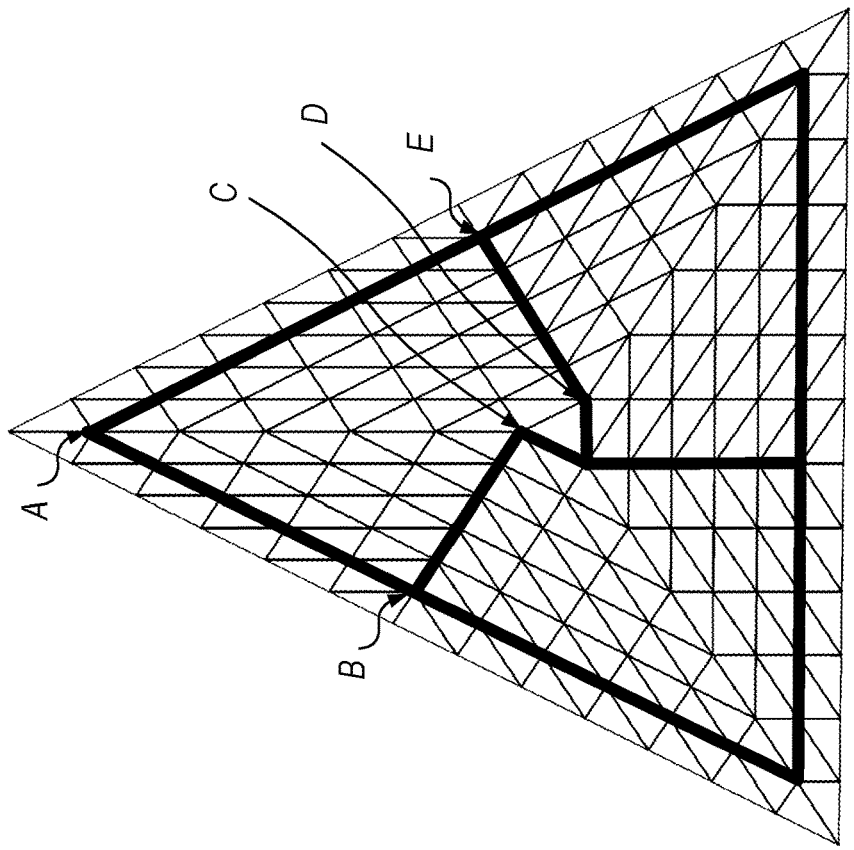

FIG. 9 is a diagram illustrating an exemplary technique for determining quad-shaped region borders for both triangular and quad patches. Note that although these boundaries are discussed for purposes of explanation, they may not actually be determined, stored, or communicated in a hardware implementation. Rather, tessellation circuitry 210 may determine walk-order for triangles in each quad-shaped region or sub-patch and generate triangle strips to represent them.

In some embodiments, tessellation circuitry 210 is configured to determine quad-shaped region coordinates using this or similar techniques. In the illustrated example, the technique begins at a corner of the patch, point A in the example and proceeds to a halfway point along a first edge (to point B, in the example). This may require determining the number of points on the edge based on a tessellation level and determining the halfway point (which may not actually be halfway, as shown, for even numbers of points on an edge; tessellation circuitry 210 may be configured to handle this situation by deterministically selecting a point adjacent to the center of the edge to accomplish the disclosed techniques). Tessellation circuitry 210 then counts the rings and moves toward the center of the patch. In the illustrated example, tessellation circuitry 210 then handles primitive(s) at the center of the patch, if present (both the patches in the example include one or more central primitives). In the illustrated example, this requires determining the traversal from point C to point D around a portion of the central primitive(s). Note that this step may only be performed for one of the quad-shaped regions (for triangular patches, the other two quad-shaped regions may include an added edge to handle the central primitive, as shown, which may also be handled at this step). In the illustrated example, tessellation circuitry then proceeds to count the rings to the edge of the patch at point E and then back to the original starting point of point A. Thus, tessellation circuitry 210 may determine and store the coordinates of quad-shaped regions. In hardware implementations, tessellation circuitry 210 may be configured to determine the coordinates of points defining a given quad-shaped region or sub-patch (and/or multiple quad-shaped regions or sub-patches) in parallel.

In some embodiments, the determination of whether there is a central primitive in a triangular patch (like the situation in FIG. 9 and in contrast to the situation of FIG. 5) is evaluated as true if the spacing is fractional odd or if the spacing is equal and the number of inner divisions is odd. In some embodiments, the determination of whether there are central primitives in a quad patch is evaluated as true if the spacing is fractional odd or if the spacing is equal, the number of width divisions is odd, and the number of height divisions is odd.

In some embodiments, the topological consistency of the quad-shaped regions may result in a simplified division into sub-patches (e.g., relative to directly dividing a patch into sub-patches). In some embodiments, tessellation circuitry 210 is configured to determine dimensions of sub-patches, e.g., by taking the square root of the threshold to obtain an approximate value for the number of vertices a sub-patch should contain. In some embodiments, tessellation circuitry 210 may be configured to also account for duplicated vertices at the edges of sub-patches when determining the number of vertices for each sub-patch.

In some embodiments, tessellation circuitry 210 is configured to generate initial coordinates using a three-valued form, e.g., an index of a quad-shaped region and X and Y location within the indicated region. In some embodiments, tessellation circuitry 210 is configured to generate barycentric coordinates for each sub-patch. For example, barycentric coordinates may define the lower left corner of a triangular patch as (0,0,1), the upper corner as (0,1,0), and the lower right corner as (1,0,0). Similarly, the corners of a quad patch may be defined as (0,0), (0,1), (1,0), and (1,1). In some embodiments, tessellation circuitry 210 is configured to determine the locations of primitives, sub-patch boundaries, quad-shaped region boundaries, etc. in barycentric form. In some embodiments, vertex processing circuitry is configured to receive or independently derive barycentric coordinates for vertices in each sub-patch.

Exemplary Method

FIG. 10 is a flow diagram illustrating an exemplary method 1000 for generating sub-patches for independent processing, according to some embodiments. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1010, in the illustrated embodiment, tessellation circuitry 210 receives information for a graphics patch that includes multiple tessellation factors. The factors may include spacing and tessellation levels, for example.

At 1020, in the illustrated embodiment, tessellation circuitry 210 determines a value indicative of a number of vertices for the patch based on the tessellation factors. This may be based on the tessellation levels, for example.

At 1030, in the illustrated embodiment, tessellation circuitry 210 divides at least a portion of the patch (e.g., all but the outer ring) into a predetermined number of regions in response to determining that the value meets a threshold number. In the illustrated embodiment, the number of regions is based on the shape of the patch (e.g., three regions for triangle patches or four regions for quad patches). This may include determining whether the patch has one or more central primitives and including the central primitive(s) in one of the regions.

At 1040, in the illustrated embodiment, tessellation circuitry 210 divides at least one of the regions into a number of sub-patches in response to determining that a value indicative of a number of vertices for the region meets the threshold number. In the illustrated embodiment, tessellation circuitry 210 selects the number of sub-patches such that each of the sub-patches has a value indicative of its number of vertices is less than the threshold number. In some embodiments, tessellation circuitry 210 selects the minimum number of sub-patches for the quad-shaped patch to get the number of vertices per sub-patch below the threshold.

At 1050, in the illustrated embodiment, tessellation circuitry 210 generates coordinate information indicating coordinates of the sub-patches. In some embodiments, the coordinates are specified by quad-shaped region and sub-patch within the region. In some embodiments, this may allow independent computation of vertices given sub-patch coordinates and a threshold value. In some embodiments, tessellation circuitry 210 generates barycentric coordinates for each vertex for each sub-patch. In various embodiments, this may allow independent processing of the sub-patches.

In some embodiments, graphics unit 150 may also determine ring-edge-vertex (REV) coordinates that specify a vertex of an originating patch by the ring it resides on, the edge it resides on, and the distance from that edge. In some embodiments, graphics unit 150 may expose these coordinates via an API such that they may be available to application developers for various sub-patch vertices.

At 1060, in the illustrated embodiment, vertex processing circuitry 220 independently processes the sub-patches. The processing may be independent in the sense that coordinates or data from a sub-patch are not needed for processing of the other sub-patches. Thus, a given sub-patch may be processed without waiting for other sub-patches and a sub-patch's data may not need to be maintained by circuitry 220 after it has been processed.

Exemplary Device

Referring now to FIG. 11, a block diagram illustrating an exemplary embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 150, and display unit 1165. In some embodiments, device 1100 may include other components (not shown) in addition to and/or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and/or caches. For example, compute complex 1120 may include 1, 2, or 4 processor cores, or any other suitable number. In one embodiment, cache 1130 is a set associative L2 cache. In some embodiments, cores 1135 and/or 1140 may include internal instruction and/or data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and/or memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 150 may be described as "coupled to" a memory through fabric 1110 and cache/memory controller 1145. In contrast, in the illustrated embodiment of FIG. 11, graphics unit 150 is "directly coupled" to fabric 1110 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and/or low-power always-on functionality, for example. I/O bridge 1150 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1100 via I/O bridge 1150.

In some embodiments, various elements of device 1100 may include clock gaters arranged hierarchically, including various series of DET clock gaters coupled to deliver clock signals to different portions of a clock tree. The disclosed techniques may reduce switching power consumption in device 1100, balance the clock delay to different portions of device 1100, reduce errors in device 1100, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 12 is a block diagram illustrating an exemplary non-transitory computer-readable storage medium that stores circuit design information, according to some embodiments. In the illustrated embodiment semiconductor fabrication system 1220 is configured to process the design information 1215 stored on non-transitory computer-readable medium 1210 and fabricate integrated circuit 1230 based on the design information 1215.

Non-transitory computer-readable medium 1210, may comprise any of various appropriate types of memory devices or storage devices. Medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1210 may include other types of non-transitory memory as well or combinations thereof. Medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabrication at least a portion of integrated circuit 1230. The format of design information 1215 may be recognized by at least one semiconductor fabrication system 1220. In some embodiments, design information 1215 may also include one or more cell libraries which specify the synthesis and/or layout of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit. For example, design information 1215 may specify the circuit elements to be fabricated but not their physical layout. In this case, design information 1215 may need to be combined with layout information to actually fabricate the specified circuitry.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown in FIG. 1B or 2. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising: tessellation circuitry configured to:
   receive information for a graphics patch that specifies multiple tessellation factors;
   determine a value indicative of a number of vertices for the patch based on the tessellation factors;
   in response to determining that the value meets a threshold number, divide at least a portion of the patch into a predetermined number of regions where at least one of the regions has four sides or five sides and at least one of the regions has six sides, wherein the number of regions is based on the shape of the patch, wherein the patch includes an inner portion that is tessellated based on one or more inner tessellation levels and an outer ring corresponding to one or more outer tessellation levels and wherein the at least a portion of the patch is the inner portion;
   in response to determining that a value indicative of a number of vertices for one of the regions meets the threshold number, divide the region into a number of subpatches, wherein ones of the sub-patches include vertices for multiple primitives, including to select the number of sub-patches such that each of the sub-patches has a value indicative of its number of vertices that is less than the threshold number; and
   generate coordinate information indicating coordinates of the sub-patches; and
   graphics processing circuitry configured to access the coordinate information and independently process the sub-patches.

2. The apparatus of claim 1, wherein the graphics processing circuitry includes a memory configured to store vertex information for up to the threshold number of vertices.

3. The apparatus of claim 1, wherein the tessellation factors include inner and outer tessellation levels and a spacing parameter.

4. The apparatus of claim 1, wherein the predetermined number of regions is three for triangle patches and four for quad patches.

5. The apparatus of claim 1, wherein a difference between the number of primitives in ones of the regions is at most two.

6. The apparatus of claim 1, wherein the tessellation circuitry is configured to generate barycentric coordinates for vertices in each sub-patch.

7. A method, comprising:
   receiving, by tessellation circuitry, information for a graphics patch that specifies multiple tessellation factors;
   determining, by the tessellation circuitry, a value indicative of a number of vertices for the patch based on the tessellation factors;
   in response to determining that the value meets a threshold number, the tessellation circuitry dividing at least a portion of the patch into a predetermined number of regions where at least one of the regions has four sides or five sides and at least one of the regions has six sides, wherein the number of regions is based on the shape of the patch, wherein the patch includes an inner portion that is tessellated based on one or more inner tessellation levels and an outer ring corresponding to one or more outer tessellation levels, and wherein the at least a portion of the patch is the inner portion; and
   in response to determining that a value indicative of a number of vertices for one of the regions meets the threshold number, the tessellation circuitry dividing the region into a number of sub-patches, wherein ones of the sub-patches include vertices for multiple primitives, including selecting the number of sub-patches such that each of the sub-patches has a value indicative of its number of vertices that is less than the threshold number;
   generating, by the tessellation circuitry, coordinate information indicating coordinates of the sub-patches; and
   accessing, by graphics processing circuitry, the coordinate information and independently processing the sub-patches.

8. The method of claim 7, wherein the tessellation factors include multiple inner tessellation levels, multiple outer tessellation levels, and a spacing parameter that indicates equal, fractional even, or fractional odd spacing.

9. The method of claim 7, wherein the predetermined number of regions is three for triangle primitives and four for quad primitives.

10. The method of claim 7,
    wherein the method further comprises generating coordinates for one or more sub-patches for the outer ring.

11. The method of claim 7, further comprising generating barycentric coordinates for vertices in each sub-patch.

12. The method of claim 7, wherein a difference between the number of primitives in ones of the regions is at most two.

13. A non-transitory computer readable storage medium having stored thereon design information that specifies a design of at least a portion of a hardware integrated circuit in a format recognized by a semiconductor fabrication system that is configured to use the design information to produce the circuit according to the design, including:
tessellation circuitry configured to:
receive information for a graphics patch that specifies multiple tessellation factors;
determine a value indicative of a number of vertices for the patch based on the tessellation factors;
in response to determining that the value meets a threshold number, divide at least a portion of the patch into a predetermined number of regions where at least one of the regions has four sides or five sides and at least one of the regions has six sides, wherein the number of regions is based on the shape of the patch, wherein the patch includes an inner portion that is tessellated based on one or more inner tessellation levels and an outer ring corresponding to one or more outer tessellation levels, and wherein the at least a portion of the patch is the inner portion;
in response to determining that a value indicative of a number of vertices for one of the regions meets the threshold number, divide the region into a number of sub-patches, wherein ones of the sub-patches include vertices for multiple primitives, including to select the number of sub-patches such that each of the sub-patches has a value indicative of its number of vertices that is less than the threshold number; and
generate coordinate information indicating coordinates of the sub-patches; and
graphics processing circuitry configured to access the coordinate information and independently process the sub-patches.

14. The non-transitory computer readable storage medium of claim 13, wherein the graphics processing circuitry is configured to process the threshold number of vertices in parallel.

15. The non-transitory computer readable storage medium of claim 13, wherein the tessellation factors include inner and outer tessellation levels and a spacing parameter.

16. The non-transitory computer readable storage medium of claim 13, wherein the predetermined number of regions is three for triangle patches and four for quad patches.

17. The non-transitory computer readable storage medium of claim 13, wherein the tessellation circuitry is configured to generate barycentric coordinates for vertices in each sub-patch.

* * * * *